(12) United States Patent  
Fischer et al.

(10) Patent No.: US 7,450,716 B2  
(45) Date of Patent: Nov. 11, 2008

(54) DEVICE AND METHOD FOR ENCRYPTING DATA

(75) Inventors: Wieland Fischer, Munich (DE); Jean-Pierre Seifert, Munich (DE)

(73) Assignee: Infineon Technologies AG (DE)

( * ) Notice: Subject to any disclaimer, the term of this patent is extended or adjusted under 35 U.S.C. 154(b) by 819 days.

(21) Appl. No.: 10/874,687

(22) Filed: Jun. 22, 2004

(65) Prior Publication Data

US 2005/0041809 A1 Feb. 24, 2005

(30) Foreign Application Priority Data

Jun. 26, 2003 (DE) ............... 103 28 860

(51) Int. Cl.  
*H04K 3/00* (2006.01)

(52) U.S. Cl. ............... 380/2; 380/1; 726/34

(58) Field of Classification Search .......... 380/1  
See application file for complete search history.

(56) References Cited

U.S. PATENT DOCUMENTS

| | | | | |
|---|---|---|---|---|
| 5,631,960 A | * | 5/1997 | Likens et al. ............. | 380/2 |
| 5,991,415 A | * | 11/1999 | Shamir ............. | 380/30 |
| 6,101,254 A | * | 8/2000 | Thiriet ............. | 380/2 |
| 6,144,740 A | * | 11/2000 | Laih et al. ............. | 380/2 |
| 6,724,894 B1 | * | 4/2004 | Singer ............. | 380/28 |
| 7,162,031 B1 | * | 1/2007 | Roelofsen et al. ............. | 380/28 |
| 2002/0124179 A1 | * | 9/2002 | Kaminaga et al. ............. | 713/194 |
| 2006/0104438 A1 | * | 5/2006 | Giraud ............. | 380/28 |

FOREIGN PATENT DOCUMENTS

EP        1 237 322 A2    9/2002  
WO    WO-03/024017 A2    3/2003

OTHER PUBLICATIONS

Menezes A et al.: Handbook of Applied Cryptography; CRC Press 1996.

* cited by examiner

*Primary Examiner*—Emmanuel L Moise  
*Assistant Examiner*—David J Pearson  
(74) *Attorney, Agent, or Firm*—Dickstein, Shapiro, LLP.

(57) ABSTRACT

For a secure encryption of original data the original data are first of all encrypted using an encryption key or an encryption algorithm. The thus obtained data are then again decrypted using a decryption algorithm and a decryption key in order to obtain decrypted data. These data are again used together with the original data in order to calculate an auxiliary key. The decrypted data are then encrypted using the calculated auxiliary key in order to obtain output data. In case of a DFA attack no output of the device is suppressed, but the output result is encrypted using the auxiliary key which deviates from the original encryption key in case of the DFA attack so that an attacker cannot use the output data anymore and the DFA attack is useless.

12 Claims, 2 Drawing Sheets

FIG 2

| symmetrical crypto system | | asymmetrical crypto system (signature) | |
|---|---|---|---|
| $k_E$ | $k_D$ | $k_E$ | $k_D$ |
| k | k | e: private key | d: public key |
| E alg | D alg | E alg | D alg |
| AE/AE$^{-1}$ | AE$^{-1}$/AE | AE/AD | AE/AD |

$k_E$: encryption key
$k_D$: decryption key
E alg: encryption algorithm
D alg: decryption algorithm
AE: algorithm encryption

DEVICE AND METHOD FOR ENCRYPTING DATA

CROSS-REFERENCE TO RELATED APPLICATION

This application claims priority from German Patent Application No. 10328860.0, which was filed on Jun. 26, 2003, and is incorporated herein by reference in its entirety.

BACKGROUND OF THE INVENTION

1. Field of the Invention

The present invention relates to encrypting technologies and in particular to encrypting technologies which are safe against DFA attacks.

2. Description of the Related Art

In recent times it was found that the DFA attack (DFA=differential fault analysis) is a very effective attack on cryptosystems. In particular, it was stated that in RSA systems in which the Chinese Remainder Theorem (CRT) is used for modular exponentiation, already a single "faulty" output due to a DFA attack may be sufficient to "determine" the secret key for example in a signature calculation. On the other hand, the modular exponentiation in the RSA algorithm is preferably calculated using the CRT, as in particular for large modules a high calculating efficiency may be achieved. The RSA algorithm for message ciphering and message deciphering, respectively, or for signature calculation is described in its application with or without CRT in "Handbook of Applied Cryptography", A. Menezes et al., CRC Press, 1996. While for an efficient calculation of the modular exponentiation without CRT calculating units are required whose width is at least as large as the modulus, based on the RSA CRT algorithm using a calculating unit with a predetermined number of elementary cells, i.e. a predetermined length, a calculation may be performed in which the modulus (and therefore the key) has almost twice the length compared to the calculating unit. This is especially important for RSA applications, as here the security against so called "brute force attacks" in which subsequently all possibilities are tested increases with an increasing key length.

The basic idea of a DFA attack is to subject the cryptochip to an extreme situation during performing a cryptographical calculation, so that the output of the cryptochip becomes faulty. Such a measure is for example to expose the chip to a high mechanical voltage, a high electromagnetic radiation, a series of light flashes etc. during the calculation, such that for example register contents of the chip become faulty or that gates within the chip do not fulfill their specified function anymore but something different which leads to an output fault.

It was shown that such a faulty output is faulty, still as much information about the secret on which an algorithm is based is contained, however, like for example the encryption key in case of a symmetric cryptosystem or the private key in case of an asymmetric cryptosystem, that an effective DFA attack may be performed.

Defence measures against such DFA attacks in the simplest case consist in the fact that, for example, each cryptographic calculation is performed twice, wherein the result of the first cryptographic calculation is compared to the result of the (identical) second cryptographic calculation. Depending on this comparison a query takes place consisting in the fact that in a (positive) case in which both results are identical, an output is performed, while in the case in which the two results are different, an output is prevented or at least an alarm message is provided, respectively. The core of this defence measure is therefore, in the case in which the assumption about a fault is present, to suppress any outputs, so that an attacker will not obtain a chip output when he has performed a DFA attack, and therefore may not draw any conclusion to the secret that the algorithm is based on.

The above-mentioned defence measure against DFA attacks is problematic in so far that it assumes that the chip does not make the same mistake in the double calculation. Such an attack would not be recognized.

Alternative measures are to provide the cryptochip with voltage sensors, radiation sensors, temperature sensors etc. in order to be able to detect possible exterior attacks on the chip directly in order to then be able to suppress an output when an attack is detected.

Due to the variety of attack scenarios and the many sensors connected to the same, such a defence measure may often not or only partially be performed.

Still further defence measures are to compare intermediate results within a (longer) cryptoalgorithm to each other or observe the same, respectively. Often dependencies exist within an algorithm which require a number of intermediate results already before the output which have to be in a certain connection to each other independent of the data to be encrypted or the key, respectively. If it is determined that the intermediate results, which actually should be in a certain connection to each other in a correct algorithm run, are not in this connection it may be concluded that an attack is being performed. In this case again an IF branch, i.e. a conditional jump, is performed in so far that when the expected result of the query occurs an output is performed, while when a result deviating from the expectations occurs the output is suppressed or error messages, interrupts etc. are performed, respectively, in order to, for example, indicate a current (assumed) DFA attack to the operating system.

DFA attacks on cryptosystems, like for example RSA, symmetrical systems like DES, AES and others or elliptical curve cryptosystems are thus blocked in so far that a correctness examination of some kind is performed and that in case of a fault the output of a false ciphered message or a false signature, e.g. a smartcard, respectively, is suppressed. Problematic about this defence measure is, however, the IF branch. Should an attacker be able to interfere in this final error examination, i.e. the conditional jump, then the output of a faulty ciphered message or a faulty "signature" is effected in order to thus successfully complete a DFA attack.

SUMMARY OF THE INVENTION

It is the object of the present invention to provide an improved concept for encrypting data comprising a higher security against DFA attacks.

In accordance with a first aspect, the present invention provides a device for encrypting original data, having means for encrypting original data using an encryption algorithm and an encryption key in order to obtain encrypted data; means for decrypting the encrypted data using a decryption algorithm matched to the encryption algorithm and using a decryption key matched to the encryption key in order to obtain decrypted data; means for calculating an auxiliary key having an auxiliary key function, wherein the auxiliary key function is implemented in order to provide the encryption key as an auxiliary key when the encrypted data are present in a predetermined relation to the original data and in order to provide an auxiliary key deviating from the encryption key when the original data are not present in a predetermined relation to the decrypted data; and means for encrypting the decrypted data using the encryption algorithm and the auxiliary key in order to obtain output data.

In accordance with a second aspect, the present invention provides a method for encrypting original data, with the steps of encrypting the original data using an encryption algorithm and an encryption key in order to obtain encrypted data; decrypting the encrypted data using a decryption algorithm matched to the encryption algorithm and using a decryption key matched to the encryption key in order to obtain decrypted data; calculating an auxiliary key having an auxiliary key function, wherein the auxiliary key function is implemented in order provide the encryption key as the auxiliary key when the decrypted data are in a predetermined relation to the original data and in order to provide an auxiliary key deviating from the encryption key when the original data are not in the predetermined relation to the decrypted data; and encrypting the decrypted data using the encryption algorithm and the auxiliary key in order to obtain output data.

In accordance with a third aspect, the present invention provides a computer program having a program code for performing the method for encrypting according to claim 11 when the computer program runs on a computer.

The present invention is based on the finding that the conditional jump contained in conventional DFA defence measures is a weak point of these measures. According to the invention, the DFA security is not based on this conditional jump. Instead, in case of a DFA attack the faulty result an attacker wants is encrypted again so that the information about the secret of the encryption contained in this faulty output becomes worthless for an attacker. The DFA security of the inventive concept is therefore not only restricted to the fact that a faulty output is suppressed, but that in every case an output is generated which is in case of a not performed attack the useful result of the encryption concept, which, however, is in case of an DFA attack automatically and system inherently an encrypted version of the faulty result searched by the attacker. The attacker has no possibility to decrypt the encrypted version of the faulty result, as he cannot obtain the key required for this. The key is nowhere given explicitly, and thus also unknown to the applier of the inventive concept. It merely depends on the original input data and the encrypted/decrypted data. The dependence for this is given via an auxiliary key function which may be implemented arbitrarily and which consists in the fact that the key only corresponds to the actual encryption key in the last encryption when the original data and the encrypted and again decrypted data are equal.

According to the invention, original data are therefore first encrypted in order to obtain encrypted data. The encryption is performed via an encryption algorithm and an encryption key. Then, the encrypted data is decrypted using a corresponding decryption algorithm and a corresponding decryption key in order to obtain decrypted data. Hereupon, using the original data and the decrypted data an auxiliary key is calculated which is then used for a final encryption of the decrypted data using the encryption algorithm in order to obtain output data.

In one embodiment of the present invention, this output data may be output directly. In an alternative embodiment of the present invention, the output data is still further processed in order to obtain encrypted original data as a final output. The processing takes place using a processing function which again relates the encrypted data obtained by the first encryption to the output data, so that the finally output encrypted original data only corresponds to the data encrypted using the encryption key when the encrypted data is equal to the output data at the output of the second encryption stage.

In one preferred embodiment of the present invention, the encryption algorithm and the decryption algorithm corresponding to the encryption algorithm are part of a symmetrical cryptosystem, like e.g. the DES system, the AES system etc. This is the case as symmetrical cryptosystems typically run faster and more efficiently with regard to calculation time than asymmetrical cryptosystems.

Alternatively, when calculation time resources are not decisive, the present invention is also useful in connection with an asymmetric cryptosystem, i.e. preferably with an RSA signature generation on the one hand or an RSA deciphering on the other hand.

The present invention is advantageous in so far that always an output is generated, i.e. that the security is not based on an explicit correctness test typically present in the prior art. In case of a correct encryption/signature the result is also output, as in the case of a faulty encryption/signature. In case of a faulty encryption/signature, in which a DFA attack took place with a very high probability, the result is useless for an attacker, however, as it is again encrypted by the auxiliary key which is different from the original encryption key, so that a DFA attack is unsuccessful. In other words, the faulty output which was induced by an attacker will not be useful to him as the output is encrypted and the attacker has no chance to obtain the auxiliary key by which the output is encrypted.

BRIEF DESCRIPTION OF THE DRAWINGS

These and other objects and features of the present invention will become clear from the following description taken in conjunction with the accompanying drawings, in which:

FIG. 2 shows a comparison of algorithms/keys for a symmetric cryptosystem on the one hand and an asymmetric cryptosystem on the other hand.

DESCRIPTION OF THE PREFERRED EMBODIMENTS

Figure 1:
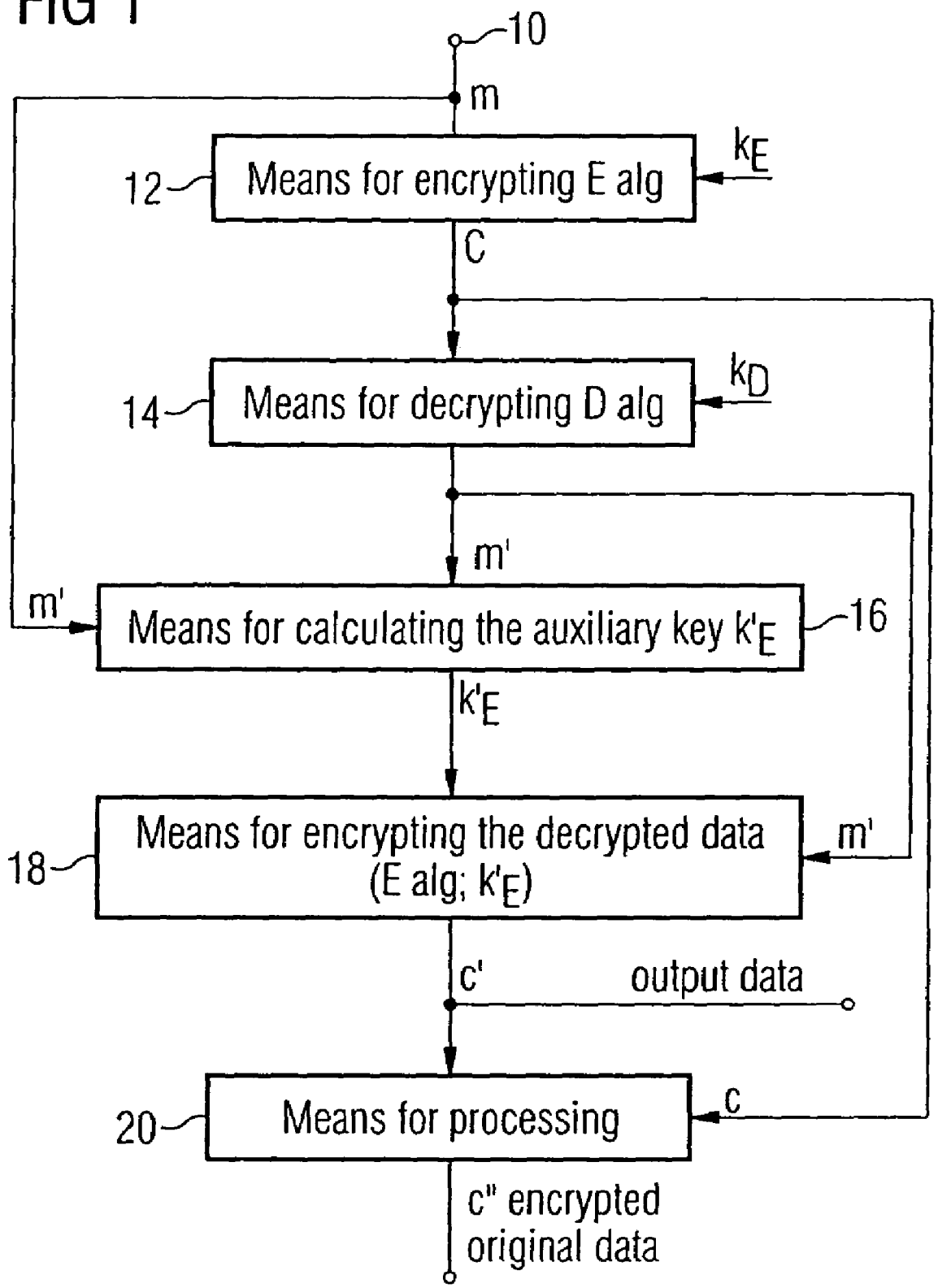
FIG. 1 shows a block diagram of a preferred embodiment of the present invention either with a direct output of output data or with a processing of output data in order to obtain the encrypted original data as an output.

FIG. 1 shows a block diagram of an inventive device for encrypting original data m fed into the overall device via an input 10. The original data m is first of all fed into means 12 for encrypting the original data m using an encryption algorithm (E ALG) and encryption key $k_E$ in order to obtain encrypted data c at the output of means 12.

The encrypted data c is then supplied to means 14 for decrypting the encrypted data supplying decrypted data m' on the output side. Means 14 for decrypting is implemented in order to use a decryption algorithm (D ALG) and a decryption key $k_D$. The encryption algorithm used in means 12 and the decryption algorithm used in means 14 form part of the cryptosystem and are matched to each other, as it is known in the prior art. Correspondingly, the encryption key $k_E$ and the decryption key $k_D$ also form parts of the cryptosystem, wherein the same are also matched to each other, as it is known in the prior art.

If means 12 and 14 operate correctly, i.e. if they were not "victims" of a DFA attack, then the decrypted data m' will correspond to the original data m. If, however, either means 12 or means 14 or both means 12 and 14 were attacked, then the original data m will be different from the decrypted data m', as either one of means 12 and 14 or both means 12 and 14 made a mistake due to the DFA attack.

Both the decrypted data m' and the original data m are supplied to means 16 for calculating an auxiliary key $k'_E$ according to the present invention. Means 16 is implemented in order to perform an auxiliary key function, wherein the auxiliary key function is implemented in order to provide the encryption key $k_E$ as the auxiliary key $k_E'$ when the decrypted data m' are in a predetermined relation to the original data m, in order to then provide a key $k'_E$ as the auxiliary key which deviates from the encryption key $k_E$ when the original data m are not in a predetermined relation to the decrypted data m'. The auxiliary key function which is in the following also referred to as ρ operates as follows:

The following holds true:

ρ: M×M×K→K

M refers to the amount of any possible messages and K refers to the amount of any possible keys. In principle, the length in byte of the keys and the messages is not important. As far as the lengths of the messages and the keys are equal the following examples may be reconsidered. If the lengths of keys and messages are different, as it is for example the case in the DES encryption algorithm, this is correspondingly considered in the function ρ.

ρ is further to have the following characteristics:

ρ(m, m', k)=k, if: m=m'

ρ(m,m',k)≠k, if: m≠m'

From the above it may be seen that the auxiliary key function which is preferably implemented so that the described predetermined relation between the original data and the decrypted data is the equality relation, may be a simple function. Thus, the same may for example be implemented in order to operate as follows, if $M=K=[0;2^N$ [for e.g. N=64, 128, 1024, . . .

$K_E'=m-m'+k_E$

Alternative embodiments of the auxiliary key function may for example be as follows:

$k_E'=\sqrt{m\cdot m'}+k_E-m$ or $k_E'=\sqrt{m\cdot m'}+k_E-m'$

As the root function may provide non integer results, an integer calculation is preferred, however, it is preferred to round up or down the results of the root function, wherein rounding up is preferred.

From the above it may be seen that for the auxiliary key function any functions may be found which fulfill the above provided general definition and which always provides something different to $k_E$ when the original data deviate from the encrypted data, so that in means 18 shown in the following in FIG. 1 for encrypting the decrypted data using the encryption algorithm (E ALG) obtained output data c' are encrypted using $k_E'$. In particular, it is preferred for the auxiliary key function and the processing function which is explained in more detail below to work without an IF condition but to calculate first of all a combination value, like e.g. a sum or a product etc. from the input data and then to combine another value with this combination value, for example using a sum, a difference etc.

In one preferred embodiment of the present invention, further no direct output of the output data c' is performed. Instead, as it is shown in FIG. 1, the output data c' together with the encrypted data c at the output of means 12 are supplied to means 20 for processing using a processing function. For the processing function, which is in the following referred to as μ, the following holds true:

μ: M×M→C

C is the amount of all encrypted messages (cipher texts). The function μ should again have the following characteristics:

μ(c, c')=c if c=c'

μ(c, c')≠c if c≠c'

For the processing function μ again any functions which fulfill the above given general definition may be used. Generally, μ should be selected so that from c" and c the value of c' cannot be simply calculated. Exemplary functions are:

$$c'' = \frac{1}{2}(c+c') + f(c-c') - f(0).$$

f( ) refers to a so called one-way function, like e.g. a Hash function, for which no inverse function $f^{-1}()$ may be given. f (0) could hereby be saved as a fixed constant so that it has not to be calculated again each time.

An alternative processing function would be:

$c''=\sqrt{c\cdot c'}+(c-c')^{R'} \bmod R''$,

R and R" are here two arbitrarily selected random numbers for which it only holds true that they are in a suitable magnitude. Although for the modular exponentiation in principle an inverse function may be indicated, however, this is hardly possible for an attacker as he does not have the random numbers R' and R".

Data c" output by means 20 therefore represent the encrypted original data which may then be output independent of whether a DFA attack took place or not. They will correspond to the encrypted data c if during the overall processing of the algorithm illustrated in FIG. 1 no attack took place. If, however, an attack took place, the encrypted original data c" output by means 20 will be different to the encrypted data at the output of means 12.

Here, it is to be noted, that modern crypto-algorithms, whether symmetric or asymmetric, have such a high encryption power that even with minimum differences between the auxiliary key $k'_E$ and the actual encryption key $k_E$ already a complete change of the output data c' compared to the encrypted data c will be present, such that the output data even with minimum differences between the encryption key and the auxiliary key will have no similarity any more with reference to the encrypted data c at the output of means 12.

In the following, an embodiment of the present invention is explained at the example of a symmetric cryptosystem:

| Input: | m, k |
|---|---|
| Output: | c" = AE(m, k) |
| | c: = AE(m, k) |
| | m': = AD(c, k) |
| | k': = ρ(m, m', k) |
| | c': = AE(m', k') |
| | c": = μ(c, c') |
| | return (c") |

As in the above-mentioned algorithmic illustration of the inventive concept, the expression "AE" stands for the algorithm encryption, while the expression "AD" stands for algorithm decryption. As the considered cryptosystem is a symmetrical cryptosystem, the encryption key $k_E$ is equal to the decryption key $k_D$, so that there is only a single key, i.e. the above illustrated key k. The case of the symmetrical cryptosystem is illustrated in the left half of the table shown in FIG. 2.

The inventive concept may, however, also be applied to an asymmetrical cryptosystem. In case of the asymmetrical cryptosystem a DFA security has to be guaranteed always when the private key is "involved", while in case the public key is "involved", no defence measures need to be taken, as the public key is known to the attacker anyway.

In case of an asymmetrical cryptosystem, further two cases need to be distinguished, i.e. the signature generation in order to obtain a digital signature for a document, and the message deciphering. So, in signature generation, the private key referred to as "e" is involved in order to generate the digital signature. In verification, however, only the public key is required, so that here no safety measures need to be taken. In an encryption using a symmetrical cryptosystem also only the public key is required. Therefore, in the encryption, no special DFA measure has to be taken. This is different, however, when a message ciphered, i. e. encrypted, within a symmetrical cryptosystem needs to be decrypted, i.e. needs to be processed using the private key of the receiver for which the message is determined.

For purposes of the present invention, therefore the "original data" are either actual clear text data, like for example in ciphering messages using a symmetrical encryption algorithm or in generating a digital signature using an asymmetrical algorithm.

The "original" data may, however, also be encrypted data, like for example in case of a deciphering of messages within a symmetrical cryptosystem or in case of a deciphering of messages in an asymmetrical cryptosystem in which the private key is used. If the "original data" are encrypted data, then the "encryption algorithm" and the "encryption key" with reference to the present application are indeed a deciphering algorithm or a deciphering key, respectively.

In this case, the "decryption algorithm" and the "decryption key" with reference to the present invention are an "encryption algorithm" or an "encryption key", respectively analogous to the above-mentioned implementations.

The right half in FIG. 2 shows the designations of the algorithms for an asymmetrical cryptosystem using the example of a signature generation.

The signature generation which takes place using the secrete key e of the asymmetrical cryptosystem corresponding to a public key d is as follows:

```
Input:      m, k
Output:     c" = AE(m, e)
            c: = AE(m, e)
            m': = AD(c, d)
            e': = ρ(m, m', e)
            c': = AE(m', e')
            c": = μ(c, c')
            return (c")
```

In case of the decryption within a symmetrical cryptosystem, however, the second alternative in the last row of the left half of the table in FIG. 2 would apply, i.e. $AE^{-1}$ for the encryption algorithm and AE for the decryption algorithm.

In case of the message deciphering within an asymmetrical cryptosystem, also the second alternative in the last row of the right half of the table in FIG. 2 would apply, i.e. that the encryption algorithm (E ALG) with regard to the present invention would correspond to a deciphering algorithm (AD) of the asymmetrical cryptosystem using the private key e, while the decryption algorithm (D ALG) with reference to the present invention would correspond to a message ciphering algorithm using the public key e.

Depending on the conditions, the inventive fault disguising method may be implemented in hardware or in software. The implementation may be performed on a digital storage medium, in particular a disc or a CD using control signals which may be read out electronically, which may thus cooperate with a programmable computer system so that the method is performed. Generally, the invention is also present in a computer program product comprising a program code stored on a machine readable carrier for performing the inventive method for encrypting original data when the computer program product runs on a computer. In other words, the invention may also be realized as a computer program having a program code for performing the method for encrypting original data when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for encrypting original data, comprising:

a first encrypter for encrypting original data using an encryption algorithm and an encryption key in order to obtain encrypted data;

a decrypter for decrypting the encrypted data using a decryption algorithm matched to the encryption algorithm and using a decryption key matched to the encryption key in order to obtain decrypted data;

an auxiliary key calculator for receiving the original data and the decrypted data, and for calculating an auxiliary key using an auxiliary key function, the original data and the decrypted data, wherein the auxiliary key function is implemented in order to provide the encryption key as an auxiliary key when the decrypted data are present in a predetermined relation to the original data and in order to provide an auxiliary key deviating from the encryption key when the original data are not present in a predetermined relation to the decrypted data; and a second encrypter for encrypting the decrypted data using the encryption algorithm and the auxiliary key in order to obtain output data.

2. The device according to claim 1, further comprising:

a processor for processing the output data and the encrypted data using a processing function in order to obtain encrypted original data, wherein the processing function is implemented in order to combine the encrypted data and the output data in order to obtain a combination result and in order to process the combination result further, so that the encrypted original data are equal to the output data or the encrypted data when the encrypted data are equal to the output data and so that the encrypted original data are unequal to the output data or the encrypted data when the encrypted data are unequal to the output data.

3. The device according to claim 2, wherein the processing function is implemented as follows:

$$c'' = \frac{1}{2}(c+c') + f(c-c') - f(0),$$

f( ) is a one-way function, wherein c illustrates the encrypted data, c' illustrates the output data and c" illustrates the encrypted original data.

4. The device according to claim 2, wherein the processing function is implemented as follows:

$$c'' = \sqrt{c \cdot c'} + (c-c')^{R'} \bmod R'',$$

wherein R' and R" are two arbitrarily selected random numbers, wherein mod represents the modulus function, wherein c represents the encrypted data, c' represents the output data and c" represents the encrypted original data.

5. The device according to claim 1, wherein the encryption algorithm and the decryption algorithm belong to a symmetrical cryptosystem and the encryption key is equal to the decryption key or is in a predetermined relation to the same, respectively.

6. The device according to claim 1, wherein the encryption algorithm and the decryption algorithm belong to an asymmetrical cryptosystem and the encryption key is a private key of the cryptosystem and the decryption key is a public key of the cryptosystem.

7. The device according to claim 6, wherein the original data are a message to be signed and the output data or the encrypted original data represent a digital signature of the message.

8. The device according to claim 1, wherein the auxiliary key function is implemented as follows:

$\rho(m,m',k)=k$, if: $m=m'$ $\rho(m,m',k)\neq k$, if: $m\neq m'$, wherein m is the original data, wherein m' is the decrypted data, wherein ρ is the auxiliary key function and wherein k represents the encryption key.

9. The device according to claim 1, wherein the decryption algorithm is matched to the encryption algorithm so that with a correct functioning of the first encrypter and the decrypter and with a correct selection of the encryption key and the decryption key the decrypted data are equal to the original data.

10. The device according to claim 1, wherein the original data are ciphered data, wherein the encryption algorithm is a deciphering algorithm of a cryptosystem, wherein the decryption algorithm is a ciphering algorithm of the cryptosystem, wherein the encryption key is a deciphering key of the cryptosystem and wherein the decryption key is a ciphering key of the cryptosystem.

11. A method for encrypting original data, comprising:
encrypting the original data using an encryption algorithm and an encryption key in order to obtain encrypted data;
decrypting the encrypted data using a decryption algorithm matched to the encryption algorithm and using a decryption key matched to the encryption key in order to obtain decrypted data;
calculating an auxiliary key using an auxiliary key function, the original data and the decrypted data, wherein the auxiliary key function is implemented in order provide the encryption key as the auxiliary key when the decrypted data are in a predetermined relation to the original data and in order to provide an auxiliary key deviating from the encryption key when the original data are not in the predetermined relation to the decrypted data; and
encrypting the decrypted data using the encryption algorithm and the auxiliary key in order to obtain output data.

12. A computer readable medium having stored thereon a computer program having a program code for performing a method for encrypting when the computer program runs on a computer, the method comprising:
encrypting the original data using an encryption algorithm and an encryption key in order to obtain encrypted data;
decrypting the encrypted data using a decryption algorithm matched to the encryption algorithm and using a decryption key matched to the encryption key in order to obtain decrypted data;
calculating an auxiliary key using an auxiliary key function, the original data and the decrypted data, wherein the auxiliary key function is implemented in order provide the encryption key as the auxiliary key when the decrypted data are in a predetermined relation to the original data and in order to provide an auxiliary key deviating from the encryption key when the original data are not in the predetermined relation to the decrypted data; and
encrypting the decrypted data using the encryption algorithm and the auxiliary key in order to obtain output data.

* * * * *